Dec. 23, 1941.    F. M. HIGGINS    2,267,562
CENTER DIFFERENTIAL FOR MULTIPLE DRIVE VEHICLES
Filed Sept. 14, 1940    2 Sheets-Sheet 1

INVENTOR
FRANCIS M. HIGGINS
BY
Wheeler, Wheeler & Wheeler
ATTORNEYS.

Dec. 23, 1941.  F. M. HIGGINS  2,267,562
CENTER DIFFERENTIAL FOR MULTIPLE DRIVE VEHICLES
Filed Sept. 14, 1940  2 Sheets-Sheet 2

INVENTOR
FRANCIS M. HIGGINS
BY
Wheeler, Wheeler & Wheeler
ATTORNEYS.

Patented Dec. 23, 1941

2,267,562

UNITED STATES PATENT OFFICE 2,267,562

CENTER DIFFERENTIAL FOR MULTIPLE DRIVE VEHICLES

Francis M. Higgins, Clintonville, Wis., assignor to The Four Wheel Drive Auto Company, Clintonville, Wis., a corporation of Wisconsin Application September 14, 1940, Serial No. 356,723

7 Claims. (Cl. 180—22)

This invention relates to improvements in center differentials for multiple drive vehicles.

In vehicles in which both front and rear axles are driven it is common to employ a center differential to divide the power between the front and rear. It is one of the objects of the present invention to provide a special differential for use in vehicles of the type in which one axle is driven at the front of the vehicle and a plurality of axles in a rear bogey are driven at the rear of the vehicle.

At the present time there are vehicles in which no center differential or compensating device is used and in this type of vehicle the front wheels are located as far forward as possible, to reduce the relative load thereon, and front wheel slippage is depended upon to compensate for the inequality. Maintenance costs on this type of construction are so high that it has been largely discontinued. In other designs the front axle is declutched except when needed for maximum traction. This concentrates the driving strain normally at the rear and when the front axle is engaged it has all of the disadvantages of high maintenance to which the first design is subject.

A third construction uses an equalized differential of the conventional type between the front and rear drives. This arrangement permits compensation for any discrepancy in travel due to road inequalities or to differences in effective radii of the tires such as may be occasioned by variations in tire inflation pressures as well as by variations in load weight. However, it delivers as much load to the front axle as to the rear of the vehicle, and for this reason it is not suited for vehicle constructions in which multiple rear axles are employed. In such instances the excessive power requirements of the multiple rear axles force an excessive amount of power to the front axle, thus overloading the mechanism and tending to cause slippage. Slippage is particularly dangerous at the front axle in view of the fact that the steering control of the wheels tends to become lost when the wheels begin to slip.

It is the primary object of the present invention to provide a differential drive particularly designed for front and rear drive trucks having two axle bogies at the rear which are fully powered, my improved power proportioning differential being adapted to distribute the power in accordance with power requirements, to relieve strain on the driving mechanism, to increase tire life, to improve performance, and to promote safety by reducing slippage of the steering wheels.

In one type of vehicle in which my improved compensating differential is employed, there is a front axle with two steering wheels and there are two rear axles each of which carries four wheels, all ten of the wheels of the vehicles being powered. It is the purpose of the present invention to solve the problems of a compensating differential by distributing power not wholly in proportion to the load carried by the several axles, and not in proportion to the number of axles that are driven, but, rather, in the primary ratio of the number of road wheels to be driven. In other words, it is my discovery that to be effective a compensating differential in a truck of the type of which this invention pertains should give the front axle an advantage over the rear twin axle bogey of 4 to 1 under normal truck loadings. However, under certain conditions such a ratio between the front axle and the rear bogey would be entirely disproportionate. While the number of wheels rather than the exact load should be the primary factor, nevertheless if the vehicle is entirely or substantially unloaded, or if a radical change in contemplated loading is made either by the disposition of the load on the vehicle or by auxiliary equipment such as snow plows, derricks or the like which may be mounted at the front thereof, the amount of power delivered to the front wheels might be as far disproportionate as it would be if an uncompensated differential were used in a fully loaded truck of this type. Accordingly, it is a further object of the invention to provide a compensated differential having the ratio which I have discovered to be desirable and having further ratios available and optionally adapted for selection by the operator whereby the compensating factor of the center differential may be varied to meet approximate requirements in a given situation.

In the drawings.

Like parts are identified by the same reference characters throughout the several views.

Figure 1:
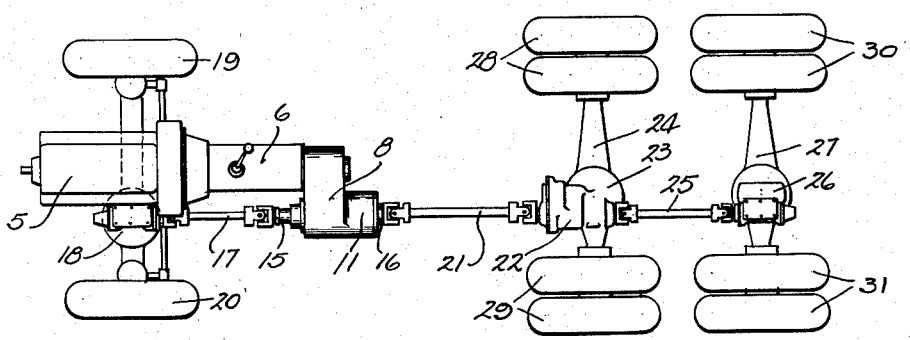
Fig. 1 is a diagrammatic layout of the drive in a vehicle having ten driven wheels including front dirigible wheels and a twin rear axle bogey having four pairs of wheels.

While the truck frame and body are not illustrated, it will be understood that they are mounted on the axles in the usual way.

The engine 5 delivers its power through a conventional transmission case 6 to the shaft 7 of a transfer case 8 in which chains or gears are used to deliver the power downwardly from the level of shaft 7 and, usually to one side, to a sprocket 9 on the tubular shaft 10 of the compensating differential.

Figure 2:
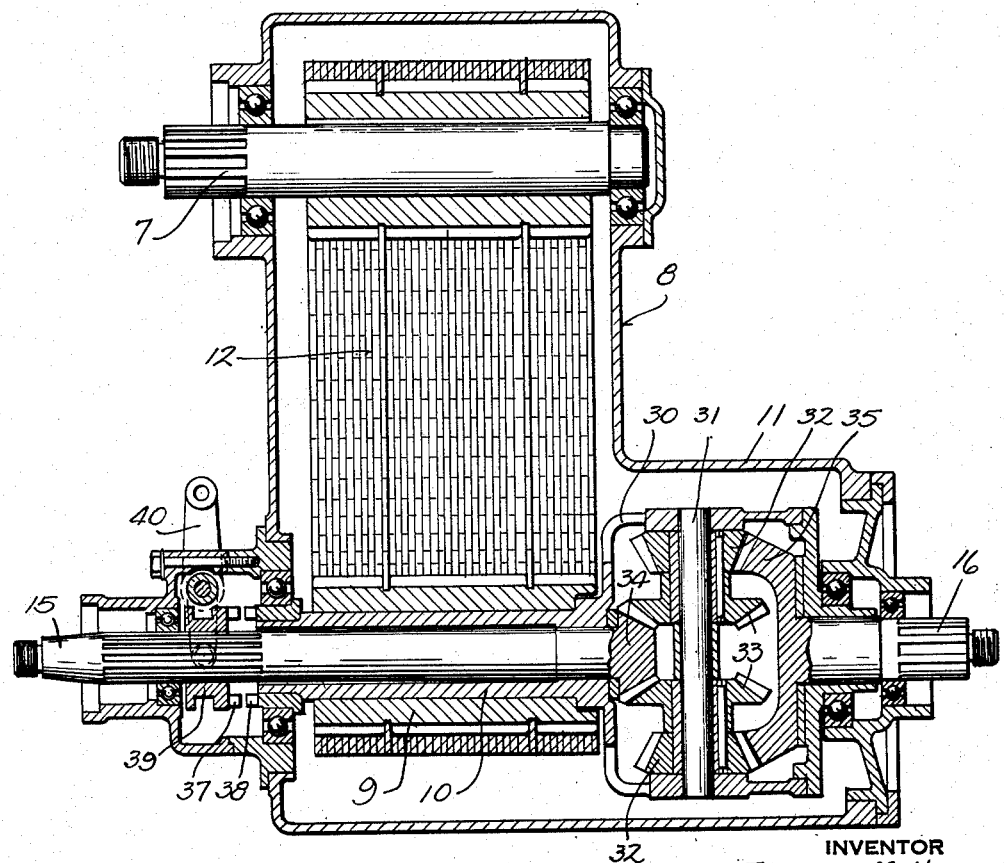
Fig. 2 is a greatly enlarged view in longitudinal section of an improved transfer case organization in which is incorporated a compensating differential of the type having the advantages above outlined.

The transfer case 8 is elongated at 11 axially of the shaft 10 to receive the compensating differential shown in detail in Fig. 2. Piloted within the tubular shaft 10 and projecting from one end of the transfer case, is driven shaft 15. Projecting rearwardly from the other end of the case is driven shaft 16. A suitable universally jointed drive shaft 17 connects the front driven shaft 15 to a differential of the conventional type in housing 18 on the front axle, whereby the front wheels 19 and 20 receive power in the usual manner.

Similarly a universally jointed drive shaft 21, connected with driven shaft 16 at the rear of the transfer case, leads to a distributing differential in housing 22, one side of which is connected to a conventional differential in housing 23 on the forward axle 24 of the rear bogey. The other side of the distributing differential in case 22 is connected by another universally jointed drive shaft 25 to another conventional type differential 26 in the rear axle 27 of the rear bogey. The forward axle 24 has two pairs of driving wheels at 28 and 29. The rear axle 27 likewise has two pairs of driving wheels at 30 and 31. The rear bogey and drive, including the use of a distributing differential and two conventional differentials, is in use at the present time, as is the front axle drive. The present invention is concerned entirely with the compensating differential within the transfer case 8, 11, and therefore the details of the front and rear axle drives are not shown.

In the devices herein disclosed the chain 12 is used to transmit motion to the tubular drive shaft 10. This drive shaft carries the spider 30 in which a cross shaft 31 supports pairs of differential pinions keyed together to function as units. Each such unitary pair includes an outer pinion 32 and an inner pinion 33. The inner pinions 33 mesh with the driven gear 34 on shaft 15, the ratio of gear 34 to pinions 33 being preferably a ratio 1 to 2.

Each of the outer pinions 32 meshes with a gear 35 on driven shaft 16, the ratio of pinions 32 to gear 35 being preferably a ratio of 1 to 2. Thus the connected ratio of shaft 15 to shaft 16 is a ratio of 1 to 4, and it will be noted that although there are two axles at the rear and one in front, the driven ratio as between the front axle and the rear axle is not 1 to 2, but is 1 to 4. In other words, the ratio is not proportioned to the number of driven axles but to the total number of wheels, full effect being given to each of the rear wheels 28, 29, 30 and 31, even though these wheels are not independently driven but are driven in pairs.

Where traction is lost either at the front or at the rear of the vehicle, it is possible to lock the compensating center differential by means of clutch elements 37 and 38. Clutch element 38 is carried by the tubular driving shaft 10, while clutch element 37 is mounted on a shipping spool 39 splined to the driven shaft 15 and shifted by a shipping lever 40 to and from engagement with clutch element 38. When the clutch elements are engaged no movement between the driving shaft 10 and driven shaft 15 is possible, and hence the entire differential is locked. When the clutch elements are disengaged, as in the positions in which they are illustrated, the various shafts are free for compensating differential movement and in view of the mechanical advantage of the front driven shaft over the rear driven shaft it will be apparent that four times as much power will be delivered to the rear wheels as to the front wheels.

For all ordinary loadings it will be proper to deliver four-fifths of the total power to the rear bogey, which carries four-fifths of the total number of wheels. However, a vehicle equipped with an eight wheel rear bogey is designed, when loaded, to carry enormous weights, and it may well be that when such a vehicle is unloaded it will be disadvantageous to apply four times as much power to the rear bogey as is applied to the front wheels. In quick starts or in the use of the retarding effect of the engine when stopping, slippage of the tires on the pavement may result under such circumstances. Accordingly I have shown in Figs. 3 and 4 compensating differentials so devised as to provide for change of compensation ratio to meet these conditions.

Figure 3:
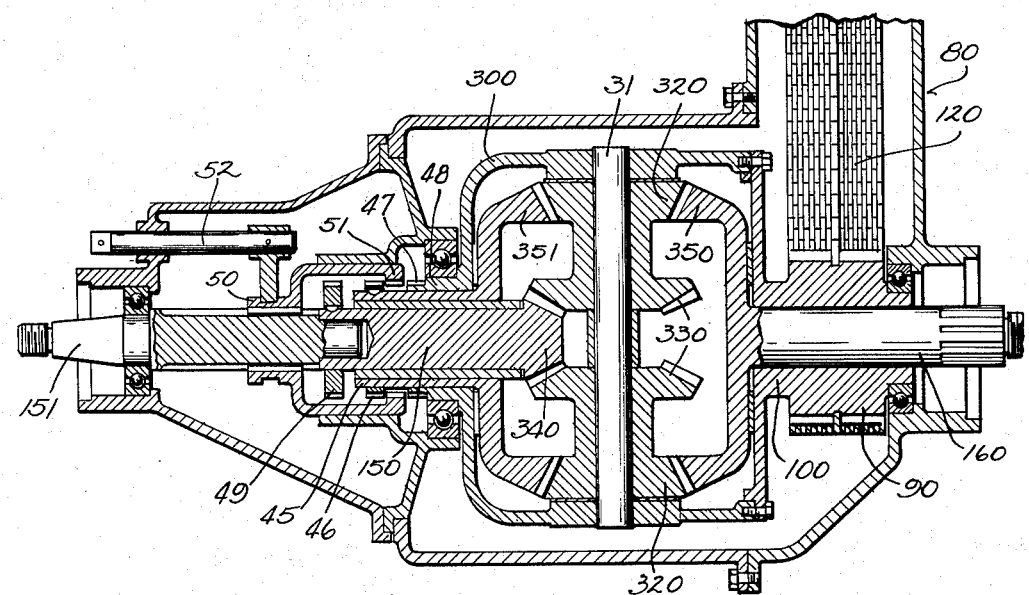
Fig. 3 is a view similar to Fig. 2 showing a modified embodiment of the invention providing for a selection of compensating ratios in the differential..

In the device shown in Fig. 3 the transfer case 80 provides a drive through chain 120 to a sprocket 90 on the tubular driving shaft 100 which actuates the spider 300. The cross shaft 31 is identical with that already described. Upon it are spool-shaped members providing pinions in pairs, the outer pinion of each pair being designated by reference character 320 and the inner pinion of each pair being designated by reference character 330. The inner pinions mesh with the driven gear 340 as already described, such gear being mounted on the driven shaft 150. The outer pinions 320 mesh with gears 350 and 351. Gear 350 is mounted on the driven shaft 160 which connects to the rear bogey. Driven gear 351 is mounted on a sleeve 45 carrying a clutch element 46 of the gear type. A similar clutch element 47 is formed in the end of the hub 48 of spider 300. Another similar clutch element 49 is mounted on the end of shaft 150. Piloted in the end of shaft 150 is driven shaft 151 leading to the front axle. Splined on shaft 151 is the hub portion 50 of a clutch element 51 which may be reciprocated by a shifting rod 52, the clutch element 51 being selectively engageable with any one of the complementary gear type clutch elements 46, 47 or 49.

When the clutch element 51 is moved to its extreme forward position, where it engages with driving clutch element 49, it serves to connect the axially aligned shafts 150 and 151. This permits the differential to function in the normal way, and inasmuch as there is a ratio of 1 to 2 between gear 340 and pinions 330, and a further ratio of 1 to 2 between pinions 320 and gear 350, it will be apparent that the desired ratio of 1 to 4 is provided between the front drive shaft connected to shaft 151 and the rear drive shaft connected to shaft 160.

When the clutch element 51 is moved to its intermediate position of engagement with clutch element 46 on the driven sleeve 45, then the output shaft 151 leading to the front axle derives its power from this sleeve, and in this event the front output shaft and the rear output shaft have gears 351 and 350 of identical size meshing with the differential pinions 320 and the power is equally divided between the front and rear of the vehicle.

When the clutch element 51 is moved to its rearmost position in engagement with clutch element 47, the output shaft 151 becomes locked to the driving spider and no differential action occurs.

Figure 4:
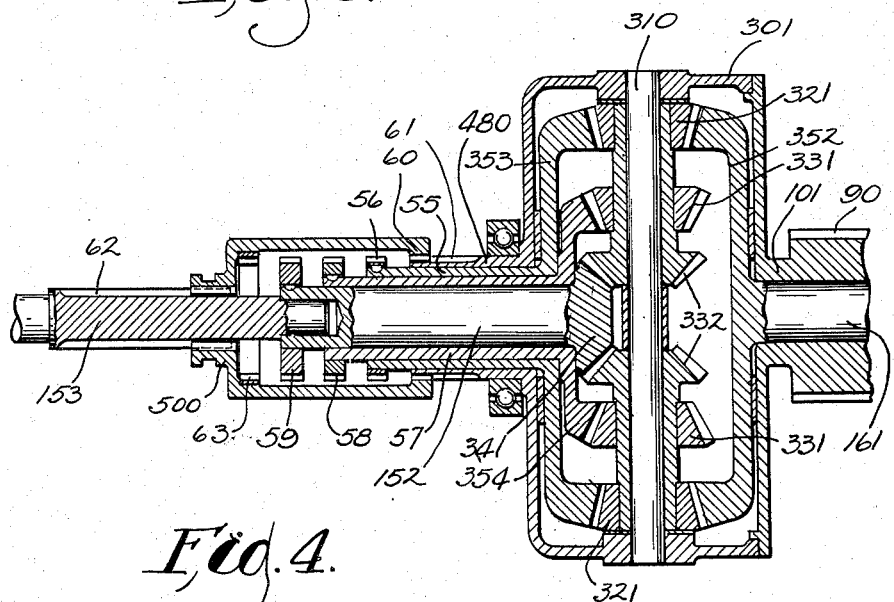
Fig. 4 is a view similar to Fig. 2 and Fig. 3 fragmentarily illustrating a further modified embodiment of the invention in which additional ratios and adjustments are available.

The construction shown in Fig. 4 is identical except that it provides first for an additional ratio between the drive to the front and the drive to the rear, and secondly, it further provides for an additional situation in which the differential is locked but independent movement of the front axles (without drive thereto) is permitted.

The sprocket 90 shown in Fig. 4 is identical with the sprocket illustrated in Fig. 3. It is mounted on the driving sleeve 101 for actuating the differential spider or cage 301 in which the elongated cross shaft 310 carries triple sets of pinions. The outer pinion 321 of each set meshes with gears 352 and 353. The intermediate pinion 331 of each set meshes with a gear 354. The innermost pinions 332 of each set mesh with gear 341. The ratio between gear 341 and pinions 332 is 1 to 1. The ratio between gear 354 and pinions 331 is 2 to 1. The ratio between gears 352 and 353 and pinions 321 is 4 to 1 in each instance.

Gear 352 is mounted on the shaft 161 connected to the rear axle bogey as previously described. Gear 353 is mounted on a sleeve 55 carrying clutch element 56. Gear 354 is mounted on an intermediate sleeve 57 carrying clutch element 58. Shaft 152 on which gear 341 is mounted, carries clutch element 59. The complementary sliding clutch member 60 may be engaged selectively with clutch elements 56, 58, or 59, or may be engaged with elongated clutch teeth 61 formed on the extended hub 480 of the spider 301.

The hub portion 500 of the external clutch element 60 is engaged with the splined teeth 62 on the forward power output shaft 153. The splines 62 do not run along shaft 153 for the full distance over which the hub 500 of the external clutch element is movable. Consequently when the clutch hub 500 clears these splines it is released from driving connection to shaft 153. In this position a supplemental clutch element 63 engages clutch element 59. The operation of the device in the various clutch positions is as follows.

When the external clutch element 60 is in its outermost position, it is in splined driving connection with the forward output shaft 153 and in engagement with the inner clutch element 59 on shaft 152 of the differential, thus giving the desired 1 to 4 ratio of power output to the front and rear of the vehicle. When the external clutch element 60 is slid rearwardly into mesh with the internal clutch element 58 the forward output shaft 153 is clutched to the intermediate sleeve 57 and the ratio of power delivery between the front and rear of the vehicle becomes 1 to 2. A further rearward displacement of the clutch element 60 into engagement with clutch element 56 connects the forward output shaft 153 to the outer sleeve 55 upon which gear 353 is mounted, whereby the power delivery ratio as between the front and rear of the vehicle is 1 to 1.

In the fourth position of clutch element 60 in which it is illustrated in Fig. 4, it remains in splined connection with shaft 153 and clutch element 60 engages clutch teeth 61 on the hub of the differential spider, thereby locking the parts against differential action and constraining the front drive shaft 153 to turn with the rear output shaft 161, without differential movement.

In the fifth position of the clutch element 60 it remains clutched to the hub of spider 301 but the hub 500 is no longer engaged with the splined teeth 62 on the output shaft 153, thus freeing the forward output shaft and allowing the front axle to function independently without power. Obviously it is necessary to maintain the differential locked under such conditions in order to deliver power to the rear bogey axles, and accordingly the supplemental clutch element 63 engages under such circumstances with clutch element 59 to lock sleeve 57 to the hub of the spider, thereby locking the entire differential and transmitting all power to the rear bogey through the rear output shaft 161.

These several compensating differentials herein disclosed solve the problems which have heretofore confronted attempts to employ such differentials. First, they provide the desirable 4 to 1 ratio which has never heretofore been attempted in a ten wheel vehicle. Secondly, they provide for eliminating the 4 to 1 ratio in one manner or another, preferably by the provision of a reduced compensating ratio under circumstances where the 4 to 1 ratio would be completely inappropriate.

I claim:

1. In a drive unit for a vehicle having two power actuated front wheels and a rear bogey having eight power actuated rear wheels, the combination with driven elements adapted for connection with the front and rear wheels respectively and having gears of different radius, of a driving pinion set providing operative connections between said elements in the ratio of 1 to 4, the element having the greater mechanical advantage being adapted for connection to the front wheels of the vehicle.

2. In a vehicle having a front axle provided with a pair of power actuated front wheels and two rear bogey axles each provided at each side with dual rear wheels, of driving connections to said axles comprising a compensating central differential having driven elements connected respectively with the front axle and with the axles of the rear bogey, gears connected with said elements and driving pinion means operatively connected between the respective gears, the ratio of the pinion means to the gear of the front driving element being four times the ratio of the pinion means to the gear of the rear driving element.

3. In a truck, the combination with a front axle provided with two driving wheels and a rear bogey comprising two axles each provided with two pairs of driving wheels, of a power distributing center differential having a first output shaft in operative connection with the front axle and the wheels thereof, a second output shaft in operative connection with the rear bogey and the axles and wheels thereof, a power input means comprising a differential spider, a driven element connected to one of said shafts, a plurality of driven elements provided with clutch means for interchangeable connection with the other of said shafts, and differential mechanism comprising pinions and gears in operative mesh and connected respectively with said spider and said elements, said pinions and gears providing a ratio of 1 to 4 between said first element and one of the elements of said plurality and providing a different ratio between said first element and another element of said plurality of elements, whereby to variably apportion power between the front and rear axles subject to the control of said clutch means.

4. A differential comprising the combination with a driving member and a plurality of driven members, all rotatable upon the same axis, said driving member being provided with a differential pinion set including pinions of differing radius in operative connection, of a differential gear carried by one of the driven members and operatively meshing with one pinion of said set, a gear mounted on the other driven member and meshing with a different pinion of said set whereby said several members are differentially connected at a compensating ratio as between the driven members for relative movement each with respect to the other, a third driven member concentric with said other driven member and provided with a gear meshing with a different pinion of said set, an output shaft adjacent said third driven member and said other driven member, and a sliding clutch element mounted on said shaft and selectively engageable alternatively with said third driven member and said other driven member, said last mentioned members having complementary clutch elements, and means engageable in another position of said clutch elements to lock said members against rotative movement.

5. A differential comprising the combination with a driving member and a plurality of driven members, all rotatable upon the same axis, said driving member being provided with a differential pinion set including pinions of differing radius in operative connection, of a differential gear carried by one of the driven members and operatively meshing with one pinion of said set, a gear mounted on the other driven member and meshing with a different pinion of said set whereby said several members are differentially connected at a compensating ratio as between the driven members for relative movement each with respect to the other, a third driven member concentric with said other driven member and provided with a gear meshing with a different pinion of said set, an output shaft adjacent said third driven member and said other driven member, and a sliding clutch element mounted on said shaft and selectively engageable alternatively with said third driven member and said other driven member, said last mentioned members having complementary clutch elements, said clutch element and output shaft having a splined connection of limited extent less than the extent of movement possible to said clutch element, whereby said clutch element is free of splined connection to said shaft in one position, and means on a plurality of said members simultaneously engaged by said clutch element in said last mentioned position, whereby said members are restrained from relative movement in said last position of said clutch element in which said output shaft is free.

6. A vehicle comprising the combination with a driven front axle having two wheels and a plurality of driven rear axles, said rear axles having eight wheels, of motion transmitting connections for driving said axles including a compensating power dividing differential having a driving pinion set, and driven gears connected respectively to drive the axles at the front and the rear and operatively meshing with said pinions, the ratio of said gears and pinions being such as to provide a differential coupling between the front driving gear and the rear driving gear of the approximate ratio of 4 to 1.

7. In a vehicle, the combination with dirigible front axle means and power actuated wheels thereon, and a rear bogey providing at least two rear axles, each having power driven dual wheels at each end; of driving means for the several wheels comprising a first driving shaft connected with the wheels of the dirigible front axle means and a second driving shaft provided with connections to the several dual wheels of the rear bogey axles; and a differential mechanism connecting said shafts and including differential pinions and gearing on the shafts meshing with the pinions, said gearing and pinions providing a plurality of power paths of different relative ratios, one of said ratios being such that the first driving shaft has a mechanical advantage over the second driving shaft through said differential mechanism in the ratio of 1:4, another of the ratios providing a lower ratio of mechanical advantage of the first shaft over the second shaft through said differential mechanism; together with shiftable clutch means for determining which of said power paths and ratios will be effective in said differential mechanism, whereby the mechanical advantage of the first shaft over the second shaft in said differential mechanism may be varied at will from a ratio of 1:4 to a lower ratio.

FRANCIS M. HIGGINS.